(12) United States Patent
Surana et al.

(10) Patent No.: US 11,877,158 B2
(45) Date of Patent: *Jan. 16, 2024

(54) CLEANING UP HANGING LAWFUL INTERCEPTION RESOURCES FROM A TRIGGERED POINT OF INTERCEPTION WHEN A TRIGGERING FUNCTION FAILS

(71) Applicant: Microsoft Technology Licensing, LLC, Redmond, WA (US)

(72) Inventors: Neeraj Surana, Bengaluru (IN); Kantha Rao Dammalapati, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,352

(22) Filed: Mar. 3, 2023

(65) Prior Publication Data

US 2023/0209358 A1    Jun. 29, 2023

Related U.S. Application Data

(63) Continuation of application No. 17/341,313, filed on Jun. 7, 2021, now Pat. No. 11,601,818.

(30) Foreign Application Priority Data

Mar. 15, 2021 (IN) .............................. 202141010829

(51) Int. Cl.
*H04W 12/80* (2021.01)
*H04W 84/04* (2009.01)

(52) U.S. Cl.
CPC .......... *H04W 12/80* (2021.01); *H04W 84/042* (2013.01)

(58) Field of Classification Search
CPC ........................... H04W 12/80; H04W 84/042
(Continued)

(56) References Cited

U.S. PATENT DOCUMENTS

| 8,478,227 B2 * | 7/2013 | Imbimbo .......... H04M 3/42348 455/435.1 |
| 11,290,500 B2 * | 3/2022 | Marfia ................ H04L 63/0892 |
| 2015/0009864 A1 * | 1/2015 | Kim .................... H04M 3/2281 370/259 |

FOREIGN PATENT DOCUMENTS

| CN | 101076196 B * | 1/2012 | |
| WO | WO-2006098668 A1 * | 9/2006 | ............. H04L 63/00 |

(Continued)

OTHER PUBLICATIONS

Li et al., "A Comprehensive Overview of Government Hacking Worldwide," in IEEE Access, vol. 6, pp. 55053-55073, 2018, doi: 10.1109/ACCESS.2018.2871762. (Year: 2018).*

(Continued)

*Primary Examiner* — Peter C Shaw
(74) *Attorney, Agent, or Firm* — Ray Quinney & Nebeker; James Bullough

(57) ABSTRACT

A system that enables hanging lawful interception (LI) resources to be cleaned up includes a triggering function set comprising a plurality of triggering functions. The system also includes a data store comprising a plurality of auditing records corresponding to the plurality of triggering functions in the triggering function set. Each auditing record comprises a claimant attribute. Each triggering function sends an update request to the data store in response to being notified about a failed triggering function within the triggering function set. Each update request comprises a request to change ownership of the auditing record corresponding to the failed triggering function. A triggering function is selected as a new owner of the auditing record correspond- (Continued)

ing to the failed triggering function based at least in part on a match between the claimant attribute in the auditing record and a claimant field in the update request sent by the triggering function.

20 Claims, 8 Drawing Sheets

(58) Field of Classification Search
USPC .......................................................... 726/1
See application file for complete search history.

(56) References Cited

FOREIGN PATENT DOCUMENTS

| WO | WO-2020263141 A1 | * | 12/2020 | ........... H04L 63/302 |
| WO | WO-2021126020 A1 | * | 6/2021 | ........... H04L 63/306 |

OTHER PUBLICATIONS

Haryadi et al., "Lawful interception data retention regulation recommendation: Recommendations for countries that do not have relevant regulations of this field," 2011 6th International Conference on Telecommunication Systems, Services, and Applications (TSSA), 2011, pp. 81-85, do (Year: 2011).*

Gundlach, "Intelligent network security—how to secure user access and the communication between IN components," IEEE Intelligent Network Workshop in '97. Proceedings, 1997, p. 15 pp. vol. 3-, doi: 10.1109/INW (Year: 1997).*

Osman et al., "Detection of JavaScript Injection Eavesdropping on WebRTC communications," 2022 IEEE 23rd International Symposium on a World of Wireless, Mobile and Multimedia Networks (WoWMoM), Belfast, United Kingdom, 2022, pp. 541-547, doi: 10.1109/WoWMoM54355.2022.00084. (Year: 2022).*

Spalt, "Current challenges for lawful interception (LI)," Telecommunications: The Infrastructure for the 21st Century, Vienna, Austria, 2010, pp. 1-6. (Year: 2010).*

* cited by examiner

CLEANING UP HANGING LAWFUL INTERCEPTION RESOURCES FROM A TRIGGERED POINT OF INTERCEPTION WHEN A TRIGGERING FUNCTION FAILS

CROSS-REFERENCE TO RELATED APPLICATIONS

This application is a Continuation of U.S. application Ser. No. 17/341,313, filed on Jun. 7, 2021, which claims the benefit of Indian Provisional Patent Application No. 202141010829 filed on Mar. 15, 2021. The aforementioned application is expressly incorporated herein by reference in its entirety.

BACKGROUND

Wireless communication systems are widely deployed to provide various types of communication content such as voice, video, data, and so on. These systems may be multiple-access systems capable of supporting simultaneous communication of one or more wireless communication devices. A wireless multiple-access communications system may include a number of base stations or network access nodes, each simultaneously supporting communication for multiple communication devices, which may be known as user equipment (UE).

Many existing wireless communication systems are fourth generation (4G) systems such as Long Term Evolution (LTE) systems, LTE-Advanced (LTE-A) systems, or LTE-A Pro systems. Fifth generation (5G) wireless communication systems are already being deployed and are expected to become widespread in the near future. The industry consortium setting standards for 5G is the 3rd Generation Partnership Project (3GPP).

One significant advantage of 5G systems is that they will have greater bandwidth, thereby providing faster download speeds. Due to the increased bandwidth, it is expected that 5G systems will facilitate many new applications in areas of technology such as Internet of Things (IoT) devices and machine-to-machine communication.

The 5G system architecture is significantly different from its predecessors in many respects. For example, in a 5G system, network management can be software driven, and network functions and resources can be virtualized at the edges and inside the network core. A 5G system implementation can be based on cloud-native applications, virtualized network functions, and microservices-based design patterns. In addition, a 5G system implementation can provide support for stateless network functions by decoupling compute and storage.

Lawful interception (LI) refers to the facilities in telecommunications and telephone networks that allow law enforcement agencies with court orders or other legal authorization to obtain communications network data for the purpose of analysis or evidence. To ensure systematic procedures for carrying out LI procedures, while also lowering the costs of LI solutions, industry groups and government agencies worldwide have attempted to standardize the technical processes behind LI.

3GPP TS 33.127 defines an LI architecture for 5G systems. Among other things, this LI architecture defines how network operators and law enforcement agents can interact. The LI architecture set forth in 3GPP TS 33.127 includes the following aspects: collection where target-related data and content are extracted from the network, mediation where the data is formatted to conform to specific standards, and delivery of the data and content to the law enforcement agency.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is a method for enabling hanging lawful interception (LI) resources to be cleaned up in a mobile network that comprises a triggering function set and a data store. The triggering function set comprises a plurality of triggering functions. The data store comprises a plurality of auditing records corresponding to the plurality of triggering functions. The method comprises causing each triggering function among the plurality of triggering functions to send an update request to the data store in response to being notified about a failed triggering function within the triggering function set. Each update request comprises a request to change ownership of an auditing record corresponding to the failed triggering function. The method also comprises selecting a triggering function as a new owner of the auditing record corresponding to the failed triggering function based at least in part on a match between a claimant attribute in the auditing record and a claimant field in the update request sent by the triggering function. The method also comprises causing the new owner of the auditing record corresponding to the failed triggering function to send at least one request to a triggered point of interception (POI) to remove an LI resource corresponding to the failed triggering function.

In some embodiments, each update request can comprise the claimant field that identifies the failed triggering function and a request to modify the claimant attribute of the auditing record to an identifier associated with a sender of the update request.

In some embodiments, the request to modify the claimant attribute is only granted when the claimant field matches the claimant attribute of the auditing record.

In some embodiments, the failed triggering function can comprise a failed session management function (SMF) and the plurality of triggering functions can comprise a plurality of SMFs.

In some embodiments, the data store can comprise an unstructured data storage network function (UDSF).

In some embodiments, the triggered POI can reside within a user plane function (UPF).

In some embodiments, the method can additionally comprise notifying the plurality of triggering functions in the triggering function set about the failed triggering function.

In some embodiments, the method can additionally comprise causing each triggering function among the plurality of triggering functions to register with a network function repository function.

In some embodiments, the at least one request that is sent to the triggered POI can comprise a first request to deactivate all tasks associated with the failed triggering function, and a second request to remove all destinations associated with the failed triggering function.

In some embodiments, the method can additionally comprise causing the new owner of the auditing record corresponding to the failed triggering function to send a request to the data store to remove the auditing record from the data store.

Another aspect of the present disclosure is directed to a method for enabling hanging lawful interception (LI) resources to be cleaned up. The method is implemented by a triggering function that belongs to a triggering function set that comprises a plurality of triggering functions. The method comprises receiving notification about a failed triggering function in the triggering function set. The method also comprises sending, in response to the notification, an update request to a data store that comprises a plurality of auditing records corresponding to the plurality of triggering functions. The update request comprises a request to change ownership of an auditing record corresponding to the failed triggering function. The method also comprises receiving, in response to sending the update request, an indication that the triggering function has been selected as a new owner of the auditing record based at least in part on a match between a claimant attribute in the auditing record and a claimant field in the update request sent by the triggering function. The method also comprises sending, in response to receiving the indication, at least one request to a triggered point of interception (POI) to remove an LI resource corresponding to the failed triggering function.

In some embodiments, the claimant field can identify the failed triggering function, and the update request can comprise a request to modify the claimant attribute of the auditing record to an identifier associated with the triggering function.

In some embodiments, the triggering function can comprise a session management function (SMF), the failed triggering function can comprise a failed SMF, and the plurality of triggering functions can comprise a plurality of SMFs.

In some embodiments, the data store can comprise an unstructured data storage network function (UDSF).

In some embodiments, the triggered POI can reside within a user plane function (UPF).

In some embodiments, the method can further comprise registering with a network function repository function (NRF). The notification about the failed triggering function can be received from the NRF.

In some embodiments, the at least one request that is sent to the triggered POI can comprise a first request to deactivate all tasks associated with the failed triggering function and a second request to remove all destinations associated with the failed triggering function.

In some embodiments, the method can additionally comprise sending a request to the data store to remove the auditing record from the data store.

Another aspect of the present disclosure is a system that enables hanging lawful interception (LI) resources to be cleaned up. The system includes one or more processors and memory in electronic communication with the one or more processors. A triggering function set is stored in the memory. The triggering function set comprises a plurality of triggering functions. A data store is also provided in the memory. The data store comprises a plurality of auditing records corresponding to the plurality of triggering functions in the triggering function set. Each auditing record comprises a claimant attribute. Instructions are stored in the memory. The instructions are executable by the one or more processors to cause each triggering function among the plurality of triggering functions to send an update request to the data store in response to being notified about a failed triggering function within the triggering function set. Each update request comprises a request to change ownership of the auditing record corresponding to the failed triggering function. The instructions are also executable by the one or more processors to select a triggering function as a new owner of the auditing record corresponding to the failed triggering function based at least in part on a match between the claimant attribute in the auditing record and a claimant field in the update request sent by the triggering function. The instructions are also executable by the one or more processors to cause the new owner of the auditing record corresponding to the failed triggering function to send at least one request to a triggered point of interception (POI) to remove an LI resource corresponding to the failed triggering function.

In some embodiments, each update request can comprise the claimant field that identifies the failed triggering function and a request to modify the claimant attribute of the auditing record to an identifier associated with a sender of the update request. The system can be configured such that the request to modify the claimant attribute is only granted when the claimant field matches the claimant attribute of the auditing record.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1A:
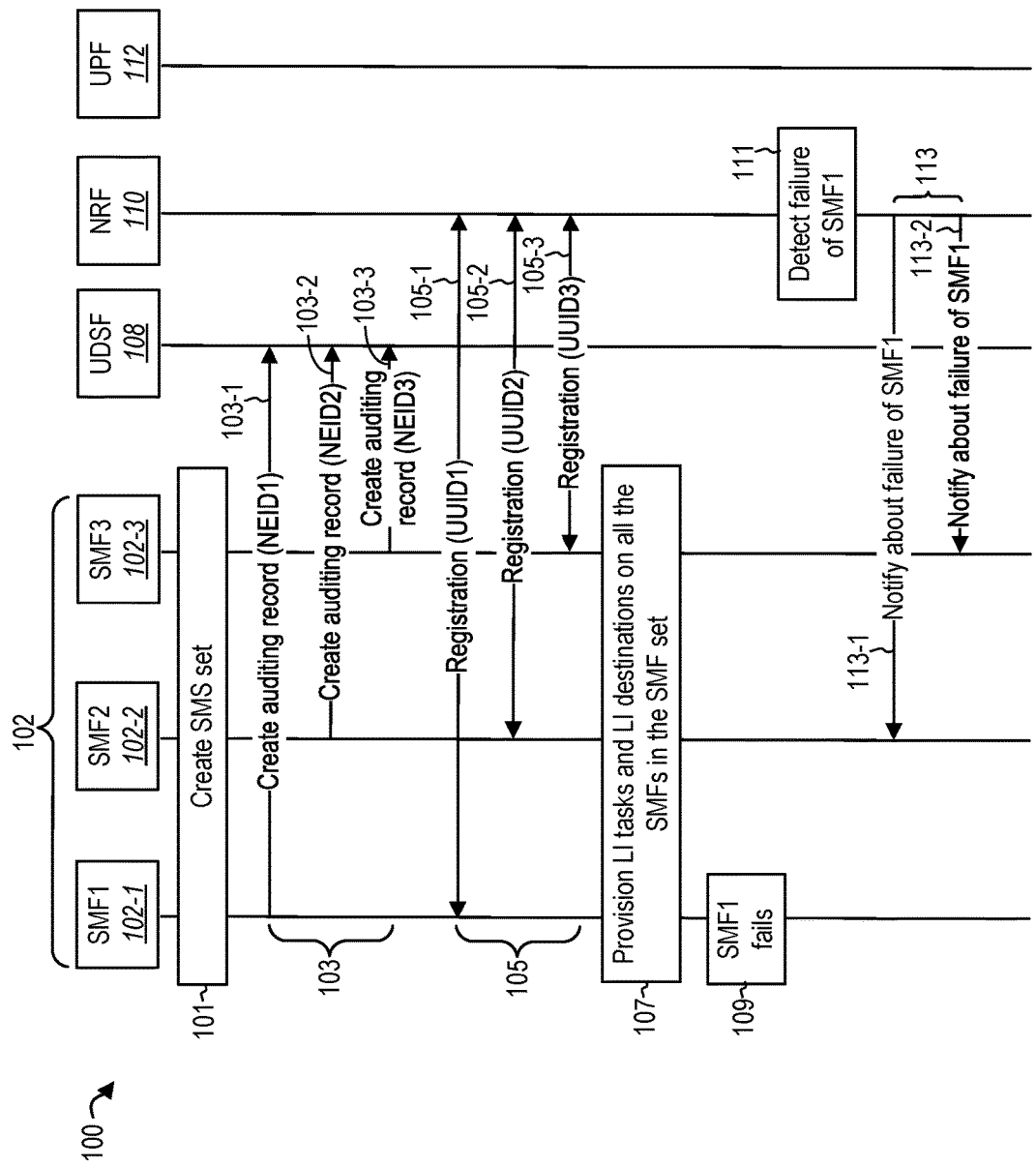
FIGS. 1A and 1B illustrate an example of a method for cleaning up hanging lawful interception (LI) resources when a session management function fails.

The present disclosure is generally related to cleaning up hanging lawful interception (LI) resources from a triggered point of interception (POI) when a triggering function fails.

As noted above, 3GPP TS 33.127 defines an LI architecture for 5G systems. In this document, the term "triggering" is defined as the action taken by a dedicated function (which is referred to as a "triggering function") to provide another dedicated function (which is referred to as a "triggered POI") that provisioning could not directly be applied to, with information that identifies the specific target communication to be intercepted.

3GPP TS 33.127 describes a scenario in which a session management function (SMF) is responsible for creating and removing LI resources on a user plane function (UPF). In this scenario, the SMF can be considered to be a triggering function, and the triggered POI resides on the UPF. For purposes of example, the systems and methods disclosed herein will be described in relation to this scenario. However, the scope of the present disclosure is not limited in this regard. The systems and methods disclosed herein are applicable to other scenarios involving other triggering functions and/or other triggered POIs.

The LI resources disclosed herein can include tasks and destinations. In this context, the term "task" can refer to the entity whose network data is being intercepted. For example, a task can be an individual subscriber, a mobile number, an IP address, etc. The term "destination" can refer to the place(s) where the intercepted data should be sent.

From time to time, an SMF can fail and experience unplanned downtime after provisioning. There are many reasons why an SMF can fail. For example, an SMF can fail because of a hardware failure. If an SMF fails after provisioning, then the UPF LI resources can remain hanging because the SMF is no longer available in the network.

The current solution to this problem is to clean up hanging resources based on inactivity. More specifically, if there is no activity on the part of the SMF for a certain period of time (which can be referred to as "Time-P2"), then the hanging resources will be cleaned up (e.g., deleted). However, there are several disadvantages with this approach. For example, with the current approach, resources will be hanging and continue intercepting user data until the expiration of Time-P2. The default value of Time-P2 is one hour, which means that under the current approach resources typically continue intercepting user data for a relatively long period of time. However, if any intercept warrant has expired or been revoked in the Time-P2 time period, then it is illegal to continue intercepting user data. Another disadvantage with the current approach is that if the SMF comes up again and sends any message to the UPF before the expiration of the Time-P2 time period, then the hanging resources will not be cleaned up.

The present disclosure proposes an auditing mechanism to take ownership of the failed SMF in order to clean up hanging resources on the UPF. The auditing mechanism disclosed herein takes advantage of the 3GPP concept of a set of SMFs. This may alternatively be referred to as creating a pool of SMFs. For consistency, the term "set" will be used in the discussion that follows.

Within a particular SMF set, each SMF can be configured with the network element identifier (NEID) as well as the network function (NF) instance ID of all other SMFs in the set. Each SMF in a particular SMF set maintains its NEID-related record in a data store that is accessible to every SMF in the SMF set. In some embodiments, the data store can be an unstructured data storage network function (UDSF). The record corresponding to a particular SMF contains a claimant attribute that identifies the SMF as the owner of the record.

Each SMF in the SMF set receives updates about the liveliness of other SMFs. In some embodiments, the updates can be received from the network function repository function (NRF) via the Nnrf interface. When any SMF goes down, all other SMFs in the SMF set are notified (e.g., by the NRF) about the status of the SMF that has failed. In addition, one of the active SMFs in the SMF set is expected to take ownership of the record corresponding to the failed SMF.

The techniques disclosed herein can use the claimant attribute of the record corresponding to the failed SMF for ownership contention resolution. Each SMF in the SMF set attempts to take ownership of the record with a conditional update. In this context, the term "conditional update" refers to a process whereby a record (including the claimant attribute) is permitted to be modified only if the claimant attribute that is present in the record matches the claimant field that is present in the query of an update request. Thus, each SMF in the SMF set attempts to update the record of the failed SMF with the NEID of the failed SMF as the claimant field in the query and their own NEID as the claimant attribute in the update record. Only one of the SMFs will succeed and take ownership, and all other SMFs fail. The SMF that is successfully able to update the record is the new owner.

The new owner then cleans up the hanging resources corresponding to the failed SMF. In some embodiments, the new owner sends a DeactivateAllTasksRequest to each UPF to remove hanging tasks and waits for DeactivateAllTasks-Response. In addition, the new owner sends a RemoveAllDestinationsRequest to each UPF to remove hanging destinations and waits for a RemoveAllDestinationsResponse. The new owner also removes the record of the failed SMF.

Figure 1B:
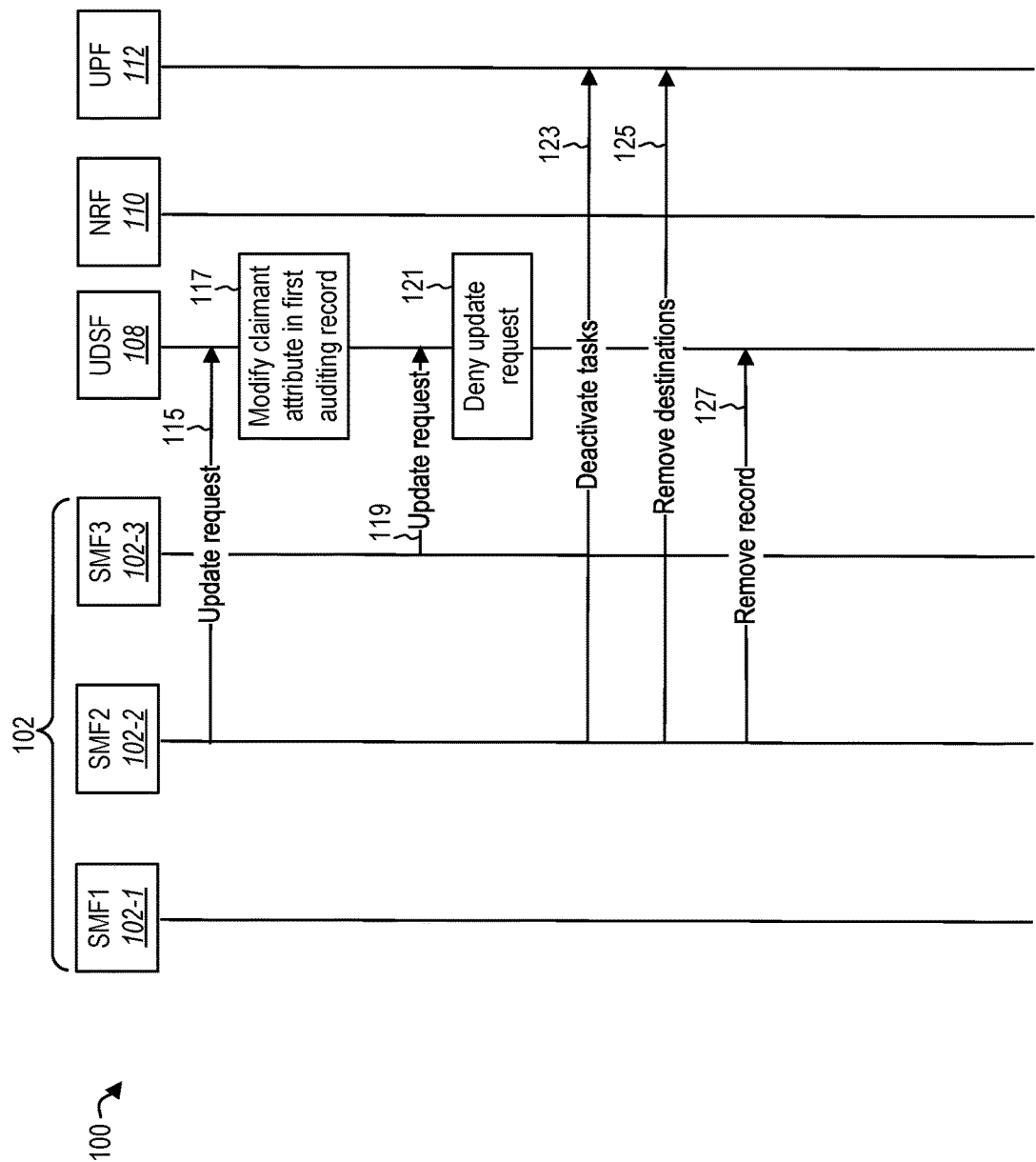

FIGS. 1A and 1B illustrate an example of a method 100 for cleaning up hanging LI resources when an SMF fails. The entities that are involved in performing the method 100 include an SMF set 102 that includes a first SMF 102-1, a second SMF 102-2, and a third SMF 102-3. Other entities that are involved in performing the method 100 include a UDSF 108, an NRF 110, and a UPF 112.

Reference is initially made to FIG. 1A. In act 101 of the method 100, the SMF set 102 is created.

Figure 1C:
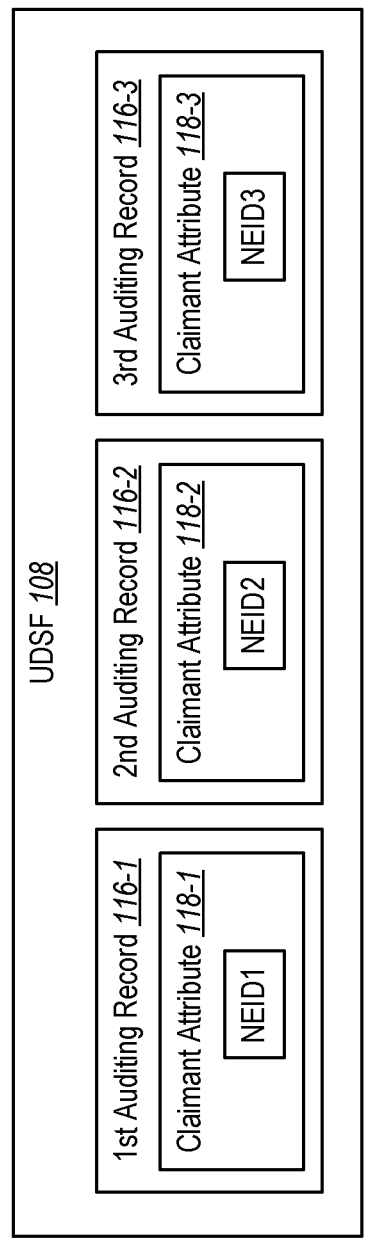
FIG. 1C illustrates aspects of the auditing records that are created as part of the method shown in FIGS. 1A and 1B.

In act 103 of the method 100, each of the SMFs in the SMF set 102 creates an auditing record in the UDSF 108. More specifically, act 103 of the method 100 includes act 103-1 in which the first SMF 102-1 creates a first auditing record 116-1, act 103-2 in which the second SMF 102-2 creates a second auditing record 116-2, and act 103-3 in which the third SMF 102-3 creates a third auditing record 116-3. Aspects of the auditing records 116-1, 116-2, 116-3 that are created are shown in FIG. 1C.

In act 103-1, the first SMF 102-1 creates a first auditing record 116-1 in the UDSF 108. The claimant attribute 118-1 of the first auditing record 116-1 is set to an identifier corresponding to the first SMF 102-1 (e.g., NEID1). In act 103-2, the second SMF 102-2 creates a second auditing record 116-2 in the UDSF 108. The claimant attribute 118-2 of the second auditing record 116-2 is set to an identifier corresponding to the second SMF 102-2 (e.g., NEID2). In act 103-3, the third SMF 102-3 creates a third auditing record 116-3 in the UDSF 108. The claimant attribute 118-3 of the third auditing record 116-3 is set to an identifier corresponding to the third SMF 102-3 (e.g., NEID3).

Referring again to FIG. 1A, each of the SMFs in the SMF set 102 registers with the NRF 110 in act 105 of the method 100. More specifically, act 105 of the method 100 includes act 105-1 performed by the first SMF 102-1 and the NRF 110, act 105-2 performed by the second SMF 102-2 and the NRF 110, and act 105-3 performed by the third SMF 102-3 and the NRF 110. In act 105-1, the first SMF 102-1 registers with the NRF 110. As part of registering with the NRF 110, the first SMF 102-1 provides the NRF 110 with an identifier (e.g., UUID1) corresponding to the first SMF 102-1. In act 105-2, the second SMF 102-2 registers with the NRF 110. As part of registering with the NRF 110, the second SMF 102-2 provides the NRF 110 with an identifier (e.g., UUID2) corresponding to the second SMF 102-2. In act 105-3, the third SMF 102-3 registers with the NRF 110. As part of registering with the NRF 110, the third SMF 102-3 provides the NRF 110 with an identifier (e.g., UUID3) corresponding to the third SMF 102-3.

In act 107 of the method 100, LI tasks and LI destinations are provisioned on all of the SMFs in the SMF set 102.

In act 109 of the method 100, the first SMF 102-1 experiences a failure and becomes unavailable.

In act 111 of the method 100, the NRF 110 detects the failure of the first SMF 102-1. In act 113 of the method 100, the NRF 110 notifies the other SMFs in the SMF set 102 that the first SMF 102-1 has failed. More specifically, act 113 of the method 100 includes acts 113-1 and 113-2. In act 113-1, the NRF 110 notifies the second SMF 102-2 about the failure of the first SMF 102-1. In act 113-2, the NRF 110 notifies the third SMF 102-3 about the failure of the first SMF 102-1.

Reference is now made to FIG. 1B. In acts 115 through 121 of the method 100, an audit mechanism is performed to see who will become the new owner of the first auditing record 116-1 corresponding to the first SMF 102-1. In accordance with the audit mechanism, only one SMF in the SMF set 102 will be able to become the new owner of the first auditing record 116-1 corresponding to the first SMF 102-1. The new owner will then be responsible for the cleanup of hanging LI resources corresponding to the first SMF 102-1.

In accordance with the audit mechanism, every SMF in the SMF set 102 tries to update the first auditing record 116-1 corresponding to the first SMF 102-1 with the NEID of the first SMF 102-1 (NEID1) as the claimant field in the query and their own NEID as the claimant attribute in the update record. The UDSF 108 is configured so that it only permits an auditing record to be modified if the claimant attribute present in the auditing record matches the claimant field present in the query of the update request.

Figure 1D:
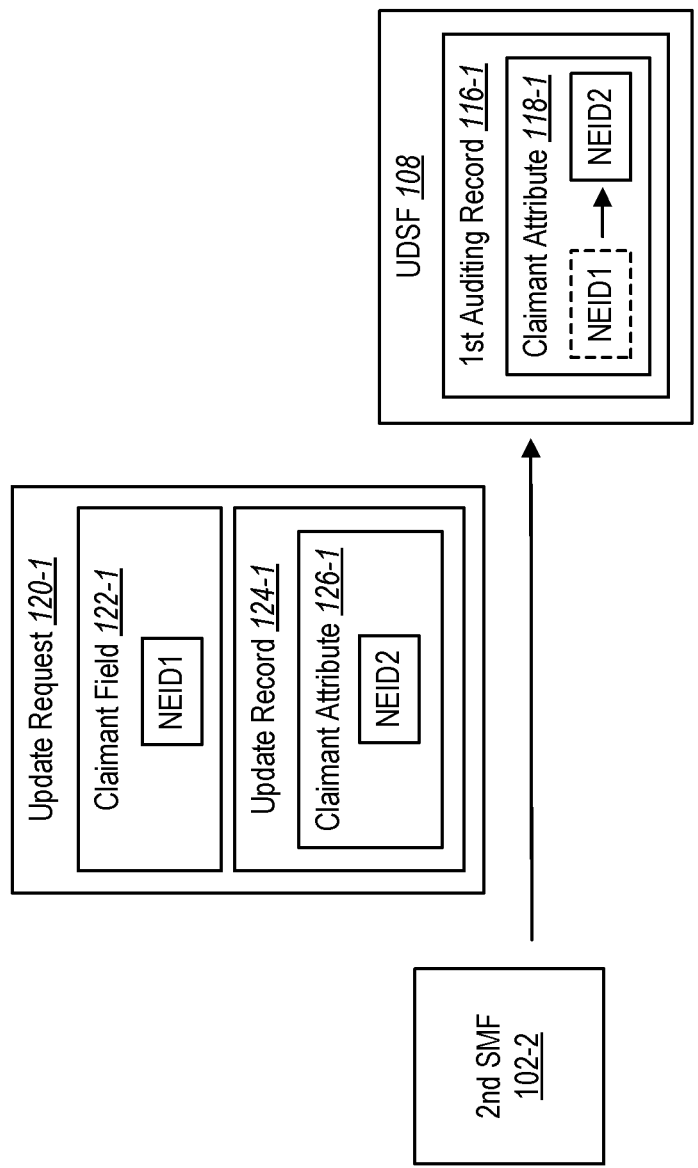
FIGS. 1D and 1E illustrate examples of update requests that can be sent to a data store in the method shown in FIGS. 1A and 1B.

In act 115 of the method 100, the second SMF 102-2 sends an update request 120-1 to the UDSF 108. The update request 120-1, which is shown in FIG. 1D, is a request to update the claimant attribute 118-1 of the first auditing record 116-1, which (as noted above) corresponds to the first SMF 102-1. The update request 120-1 includes a claimant field 122-1 and an update record 124-1. The update record 124-1 includes a claimant attribute 126-1. In the present example, the value of the claimant field 122-1 is the NEID of the first SMF 102-1 (NEID1). Because the value of the claimant attribute 118-1 in the first auditing record 116-1 matches the value of the claimant field 122-1 that is present in the update request 120-1, the UDSF 108 grants the update request 120-1. Therefore, referring to both FIG. 1B and FIG. 1D, in act 117 of the method 100 the UDSF 108 modifies the claimant attribute 118-1 in the first auditing record 116-1 to the value of the claimant attribute 126-1 in the update record 124-1 of the update request 120-1 (namely, NEID2 in this example).

Figure 1E:
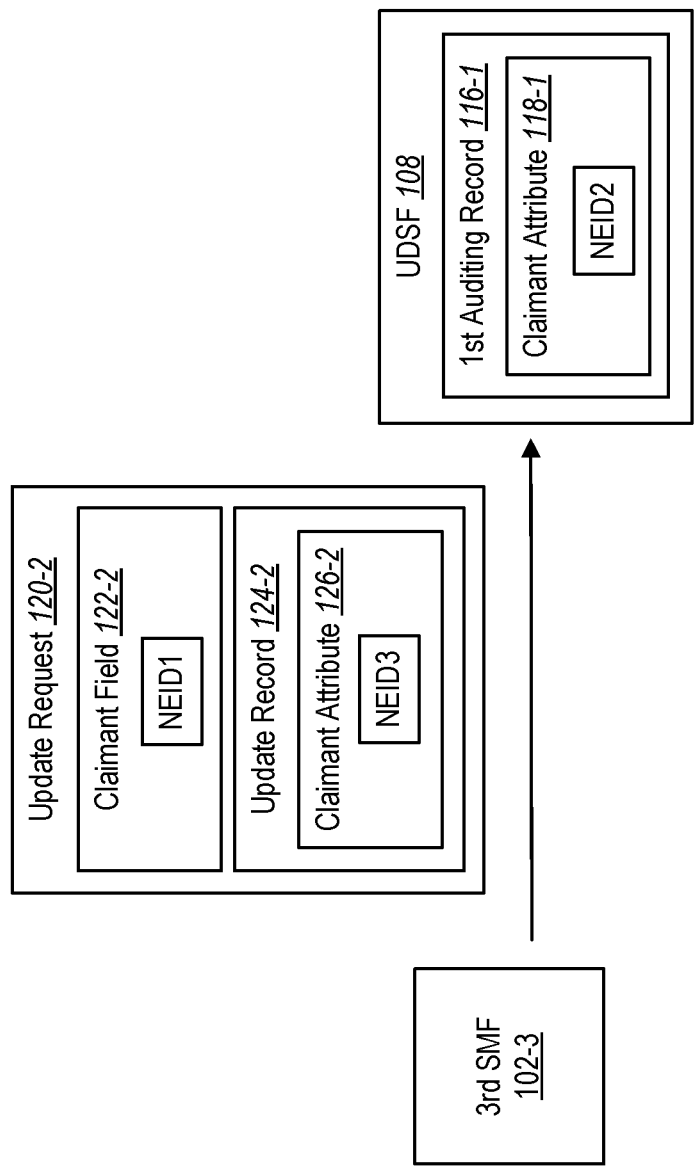

In act 119 of the method 100, the third SMF 102-3 sends another update request 120-2 to the UDSF 108. The update request 120-2, which is shown in FIG. 1E, is another request to update the claimant attribute 118-1 of the first auditing record 116-1 corresponding to the first SMF 102-1. The update request 120-2 includes a claimant field 122-2 and an update record 124-2. The update record 124-2 includes a claimant attribute 126-2. The value of the claimant field 122-2 is the NEID of the first SMF 102-1 (NEID1). However, because the value of the claimant attribute 118-1 in the first auditing record 116-1 has been changed (from NEID1 to NEID2, as discussed above), the value of the claimant attribute 118-1 in the first auditing record 116-1 does not match the value of the claimant field 122-2 that is present in the update request 120-2. Therefore, referring to both FIG. 1B and FIG. 1E, in act 121 of the method 100 the UDSF 108 denies the update request 120-2 sent by the third SMF 102-3.

Thus, the result of the audit mechanism is that the second SMF 102-2 becomes the new owner of the first auditing record 116-1. Consequently, the second SMF 102-2 takes responsibility for the cleanup of hanging LI resources corresponding to the first SMF 102-1. In the depicted method 100, the second SMF 102-2 cleans up hanging LI resources corresponding to the first SMF 102-1 in acts 123 through 127. In particular, in act 123 of the method 100, the second SMF 102-2 sends a request to the UPF 112 to deactivate all LI tasks associated with the first SMF 102-1. In act 125 of the method 100, the second SMF 102-2 sends a request to the UPF 112 to remove all LI destinations associated with the first SMF 102-1. In act 127 of the method 100, the second SMF 102-2 sends a request to the UDSF 108 to remove the first auditing record 116-1.

Figure 2A:
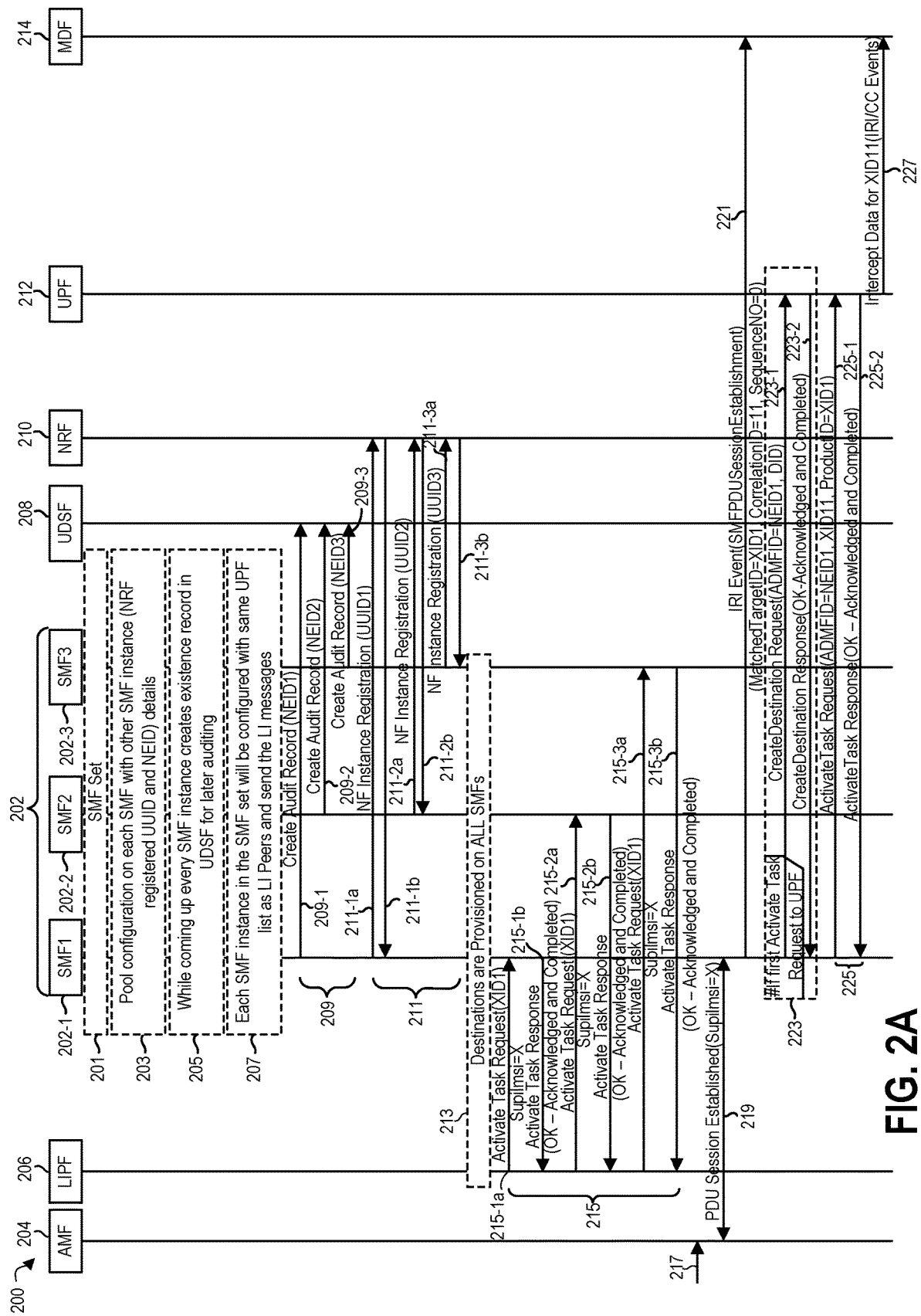
FIGS. 2A and 2B illustrate another example of a method for cleaning up hanging LI resources when a session management function fails.
Figure 2B:
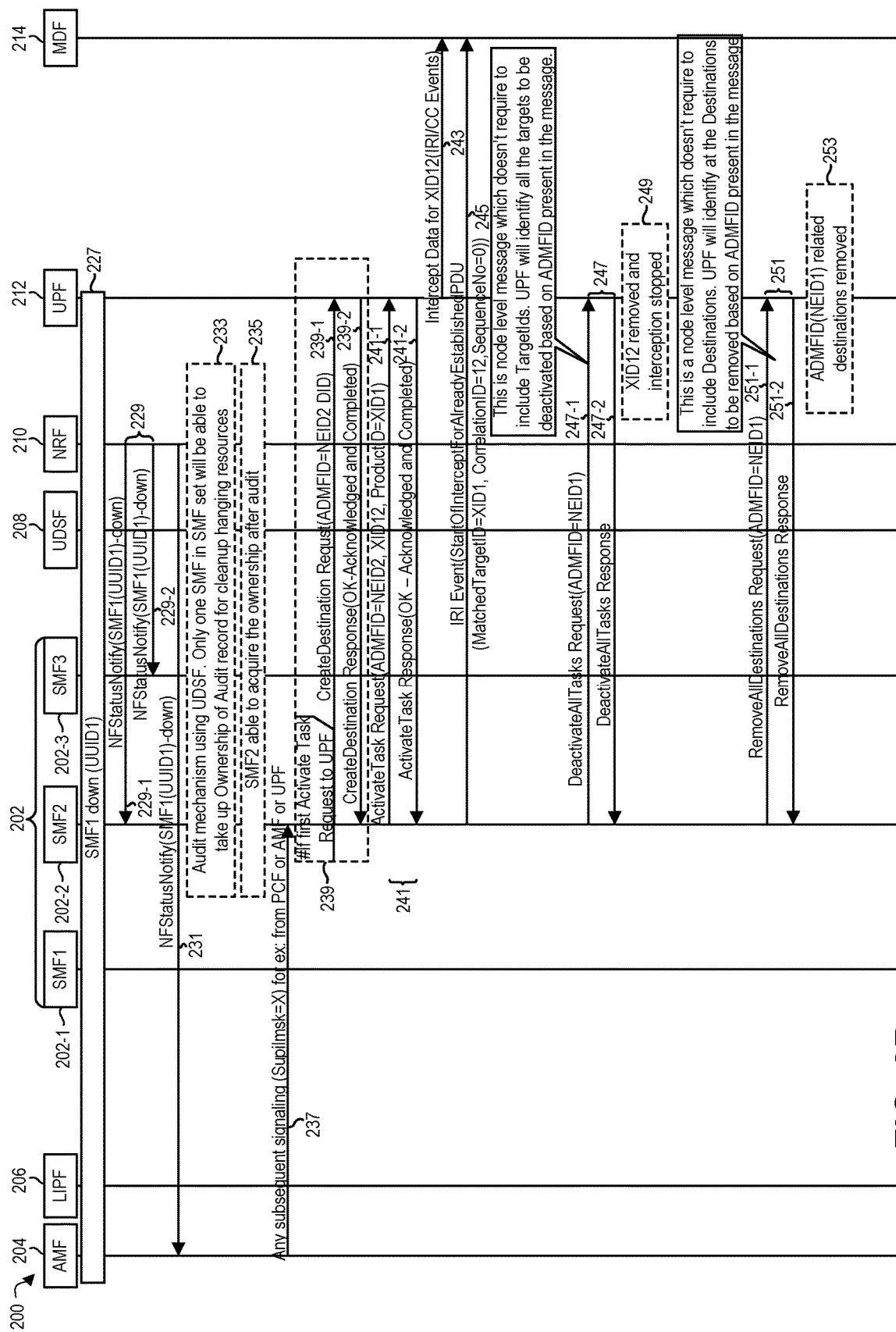

FIGS. 2A and 2B illustrate another example of a method 200 for cleaning up hanging LI resources when an SMF fails. The entities that are involved in performing the method 200 include an SMF set 202 that includes a first SMF 202-1, a second SMF 202-2, and a third SMF 202-3. Other entities that are involved in performing the method 200 include an access and mobility function (AMF) 204, a lawful interception provisioning function (LIPF) 206, a UDSF 208, an NRF 210, a UPF 212, and a mediation and delivery function (MDF) 214.

Reference is initially made to FIG. 2A. In act 201 of the method 200, the SMF set 202 is created. In act 203 of the method 200, each of the SMFs in the SMF set 202 is configured with identifying information about the other SMFs in the SMF set 202. The identifying information for a particular SMF can include the NRF registered UUID and the NEID corresponding to that SMF. For example, the first SMF 202-1 can be configured with the NRF registered UUID and the NEID for the second SMF 202-2 and the third SMF 202-3. The second SMF 202-2 can be configured with the NRF registered UUID and the NEID for the first SMF 202-1 and the third SMF 202-3. The third SMF 202-3 can be configured with the NRF registered UUID and the NEID for the first SMF 202-1 and the second SMF 202-2.

In act 205 of the method 200, each of the SMFs in the SMF set 202 creates a record in the UDSF 208.

In act 207 of the method 200, each of the SMFs in the SMF set 202 is configured with the same UPF list as its LI peers to send the LI messages.

In act 209 of the method 200, each of the SMFs in the SMF set 202 creates an auditing record in the UDSF 208. More specifically, act 209 of the method 200 includes act 209-1 performed by the first SMF 202-1, act 209-2 performed by the second SMF 202-2, and act 209-3 performed by the third SMF 202-3. In act 209-1, the first SMF 202-1 creates a first auditing record in the UDSF 208. The claimant attribute of the first auditing record is set to an identifier corresponding to the first SMF 202-1 (e.g., NEID1). In act 209-2, the second SMF 202-2 creates a second auditing record in the UDSF 208. The claimant attribute of the second auditing record is set to an identifier corresponding to the second SMF 202-2 (e.g., NEID2). In act 209-3, the third SMF 202-3 creates a third auditing record in the UDSF 208. The claimant attribute of the third auditing record is set to an identifier corresponding to the third SMF 202-3 (e.g., NEID3).

In act 211 of the method 200, each of the SMFs in the SMF set 202 registers with the NRF 210. More specifically, act 211 of the method 200 includes acts 211-1a and 211-1b performed by the first SMF 202-1 and the NRF 210, acts 211-2a and 211-2b performed by the second SMF 202-2 and the NRF 210, and acts 211-3a and 211-3b performed by the third SMF 202-3 and the NRF 210. In act 211-1a, the first SMF 202-1 registers with the NRF 210. As part of registering with the NRF 210, the first SMF 202-1 sends the NRF 210 an identifier (e.g., UUID1) corresponding to the first SMF 202-1. In act 211-1b, the NRF 210 acknowledges the registration of the first SMF 202-1. In act 211-2a, the second SMF 202-2 registers with the NRF 210. As part of registering with the NRF 210, the second SMF 202-2 sends the NRF 210 an identifier (e.g., UUID2) corresponding to the second SMF 202-2. In act 211-1b, the NRF 210 acknowledges the registration of the second SMF 202-2. In act 211-3a, the third SMF 202-3 registers with the NRF 210. As part of registering with the NRF 210, the third SMF 202-3 sends the NRF 210 an identifier (e.g., UUID3) corresponding to the third SMF 202-3. In act 211-1b, the NRF 210 acknowledges the registration of the third SMF 202-3.

In act 213 of the method 200, destinations are provisioned on all of the SMFs in the SMF set 202.

In act 215 of the method 200, the LIPF 206 activates a task request for each of the SMFs in the SMF set 202. More specifically, act 215 of the method 200 includes acts 215-1a and 215-1b performed by the LIPF 206 and the first SMF 202-1, acts 215-2a and 215-2b performed by the LIPF 206 and the second SMF 202-2, and acts 215-3a and 215-3b performed by the LIPF 206 and the third SMF 202-3. In act 215-1a, the LIPF 206 sends an activate task request message to the first SMF 202-1. In act 215-1b, the first SMF 202-1 sends an activate task response message to the LIPF 206. In act 215-2a, the LIPF 206 sends an activate task request message to the second SMF 202-2. In act 215-2b, the second SMF 202-2 sends an activate task response message to the LIPF 206. In act 215-3a, the LIPF 206 sends an activate task request message to the third SMF 202-3. In act 215-3b, the third SMF 202-3 sends an activate task response message to the LIPF 206.

In act 217 of the method 200, the AMF 204 receives a message that causes the AMF 204 to establish a PDU session with the first SMF 202-1. In act 219 of the method 200, the AMF 204 establishes a PDU session with the first SMF 202-1.

In act 221 of the method 200, the first SMF 202-1 sends a message to the MDF 214 to establish an Intercept Related Information (IRI) event.

In act 223 of the method 200, a destination is created with respect to the first SMF 202-1. More specifically, act 223 of the method 200 includes acts 223-1 and 223-2 performed by the first SMF 202-1 and the UPF 212. In act 223-1, the first SMF 202-1 sends a CreateDestination request message to the UPF 212. The CreateDestination request message is sent only if the first task is getting provisioned. In act 223-2, the UPF 212 sends a CreateDestination response message to the first SMF 202-1 (if the CreateDestination request message is sent). The CreateDestination response message acknowledges the receipt of the CreateDestination request message and indicates that the request to create the destination has been completed.

In act 225 of the method 200, a task is activated with respect to the first SMF 202-1. More specifically, act 225 of the method 200 includes acts 225-1 and 225-2 performed by the first SMF 202-1 and the UPF 212. In act 225-1, the first SMF 202-1 sends an ActivateTask request message to the UPF 212. In act 225-2, the UPF 212 sends an ActivateTask response message to the first SMF 202-1. The ActivateTask response message acknowledges the receipt of the ActivateTask request message and indicates that the request to activate the task has been completed.

In act 226 of the method 200, the UPF 212 provides intercept data to the MDF

Reference is now made to FIG. 2B. In act 227 of the method 200, the first SMF 202-1 experiences a failure and becomes unavailable.

In act 229 of the method 200, the NRF 210 notifies the other SMFs in the SMF set 202 that the first SMF 202-1 has experienced a failure and is unavailable. More specifically, act 229 of the method 200 includes acts 229-1 and 229-2. In act 229-1, the NRF 210 notifies the second SMF 202-2 about the failure of the first SMF 202-1. In act 229-2, the NRF 210 notifies the third SMF 202-3 about the failure of the first SMF 202-1.

In act 231 of the method 200, the NRF 210 notifies the AMF 204 about the failure of the first SMF 202-1.

In act 233 of the method 200, an audit mechanism is performed. In accordance with the audit mechanism, only one SMF in the SMF set 202 will be able to become the new owner of the auditing record corresponding to the first SMF 202-1. The new owner will then be responsible for the cleanup of hanging LI resources corresponding to the first SMF 202-1. For purposes of the present example, it will be assumed that as a result of the audit mechanism the second SMF 202-2 becomes the new owner of the auditing record corresponding to the first SMF 202-1. This is shown in act 235 of the method 200.

As a result of becoming the new owner of the auditing record corresponding to the first SMF 202-1, the second SMF 202-2 receives signaling in act 237 of the method 200. The signaling can come from entities such as the PCF and/or the AMF 204 and/or the LIPF 206.

In act 239 of the method 200, a destination is created with respect to the second SMF 202-2. More specifically, act 239 of the method 200 includes acts 239-1 and 239-2 performed by the second SMF 202-2 and the UPF 212. In act 239-1, the second SMF 202-2 sends a CreateDestination request message to the UPF 212. The CreateDestionation request message is sent only if the first task is getting provisioned. In act 239-2, the UPF 212 sends a CreateDestination response message to the second SMF 202-2 (if the CreateDestination request message is sent). The CreateDestination response message acknowledges the receipt of the CreateDestination request message and indicates that the request to create the destination has been completed.

In act 241 of the method 200, a task is activated with respect to the second SMF 202-2. More specifically, act 241 of the method 200 includes acts 241-1 and 241-2 performed by the second SMF 202-2 and the UPF 212. In act 241-1, the second SMF 202-2 sends an ActivateTask request message to the UPF 212. In act 241-2, the UPF 212 sends an ActivateTask response message to the second SMF 202-2. The ActivateTask response message acknowledges the receipt of the ActivateTask request message and indicates that the request to activate the task has been completed.

In act 243 of the method 200, the UPF 212 provides intercept data to the MDF 214.

In act 245 of the method 200, the second SMF 202-2 sends a message to the MDF 214 to establish an IRI event.

In act 247 of the method 200, the second SMF 202-2 deactivates all tasks associated with the first SMF 202-1. More specifically, act 247 of the method 200 includes acts 247-1 and 247-2 performed by the second SMF 202-2 and the UPF 212. In act 247-1, the second SMF 202-2 sends a DeactivateAllTasks request message to the UPF 212. The DeactivateAllTasks request message includes a request to delete all tasks associated with the first SMF 202-1. In act 247-2, the UPF 212 sends a DeactivateAllTasks response message to the second SMF 202-2. The DeactivateAllTasks response message acknowledges the receipt of the DeactivateAllTasks request message and indicates that the request to delete all tasks associated with the first SMF 202-1 has been completed. In some embodiments, the DeactivateAllTasks request message is a node-level message that doesn't have to include specific target identifiers. The UPF 212 can identify all the targets to be deactivated based on an identifier (e.g., an ADMFID) that is included in the DeactivateAllTasks request message.

In act 249 of the method 200, the tasks associated with the first SMF 202-1 are removed and interception is stopped.

In act 251 of the method 200, the second SMF 202-2 removes all destinations associated with the first SMF 202-1. More specifically, act 251 of the method 200 includes acts 251-1 and 251-2 performed by the second SMF 202-2 and the UPF 212. In act 251-1, the second SMF 202-2 sends a RemoveAllDestinations request message to the UPF 212. The RemoveAllDestinations request message includes a request to remove all destinations associated with the first SMF 202-1. In act 251-2, the UPF 212 sends a RemoveAllDestinations response message to the second SMF 202-2. The RemoveAllDestinations response message acknowledges the receipt of the RemoveAllDestinations request message and indicates that the request to remove all destinations associated with the first SMF 202-1 has been completed. In some embodiments, the RemoveAllDestinations request message is a node-level message that doesn't have to include specific destination identifiers. The UPF 212 can identify all the destinations to be removed based on an identifier (e.g., an ADMFID) that is included in the RemoveAllDestinations request message.

In act 253 of the method 200, the destinations associated with the first SMF 202-1 are removed.

In the following discussion, examples will be provided regarding various terms and phrases that are used in the above discussion.

The 5G system architecture includes many different network functions (NFs). A network function (NF) can refer to a functional building block within a network infrastructure. An NF can have well-defined external interfaces and well-defined functional behavior.

Some examples of NFs that are included in the 5G system architecture and that may be used to implement one or more aspects of the techniques disclosed herein include a user plane function (UPF), a session management function (SMF), an NF repository function (NRF), an unstructured data storage network function (UDSF), an access and mobility management function (AMF), and a lawful interception provisioning function (LIPF).

The UPF is defined in 3GPP TS 23.501. The UPF provides the interconnect point between the mobile infrastructure and the Data Network (DN), i.e. encapsulation and decapsulation of GPRS Tunnelling Protocol for the user plane (GTP-U). The UPF also provides the Protocol Data Unit (PDU) session anchor point for providing mobility within and between Radio Access Technologies (RATs), including sending one or more end marker packets to the gNB. The UPF also provides packet routing and forwarding, including performing the role of an Uplink Classifier/UL-CL (directing flows to specific data networks based on traffic matching filters) and a branching point, when acting as an Intermediate UPF (I-UPF) multi-homed to more than one PDU session anchor (PSA). The UPF also provides application detection using Service Data Flow (SDF) traffic filter templates or 3-tuple (protocol, server-side IP address and port number) Packet Flow Description (PFD) received from the SMF. The UPF also provides per-flow QoS handling, including transport level packet marking for uplink (UL) and downlink (DL), rate limiting and reflective QoS (DSCP) marking on the DL. The UPF also provides traffic usage reporting for billing and the Lawful Intercept (LI) collector interface.

A session management function (SMF) can be responsible for creating, updating, and removing PDU sessions, and managing session context with the UPF.

A network function repository function (NRF) can maintain a list of available NF instances and their profiles. The NRF can also perform service registration and discovery so that different NFs can find each other (e.g., via application programming interfaces (APIs)).

An unstructured data storage network function (UDSF) can be configured to support storage and retrieval of unstructured data by any NF.

An access and mobility management function (AMF) can be configured to receive all connection and session related information from UEs but is responsible only for handling connection and mobility management tasks. All messages related to session management can be forwarded to the SMF.

In 3GPP TS 33.127, Intercept Related Information (IRI) is defined as the intercept related information as forwarded from the Mediation and Delivery Function 2 (over the LI_HI2 interface) to the Law Enforcement Monitoring Facility. An IRI event is defined as a network procedure or event that created an xIRI in the Point of Interception.

Although the systems and methods disclosed herein have been described with reference to 5G standards, the scope of the present disclosure is not limited to 5G systems. The concepts disclosed herein may also be applied to other wireless communication systems.

Figure 3:
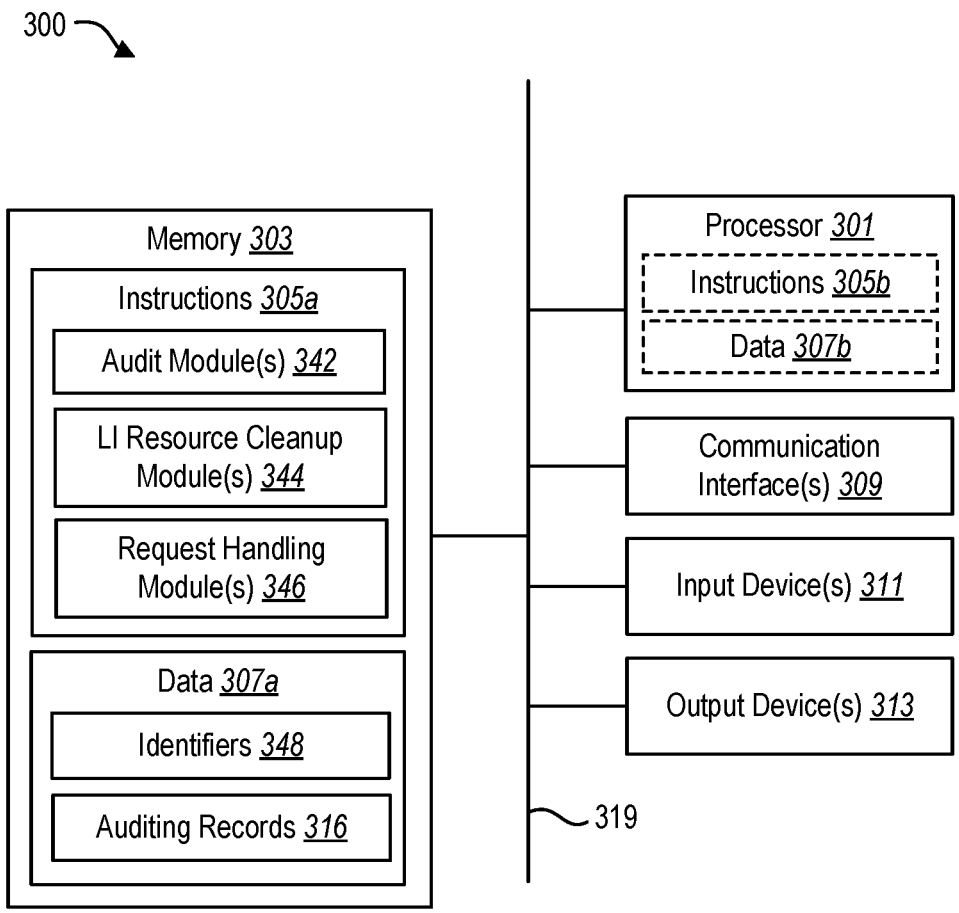
FIG. 3 illustrates certain components that can be included within a computing system that implements one or more aspects of the techniques disclosed herein.

FIG. 3 illustrates certain components that can be included within a computing system 300. The computing system 300 can be used to implement the actions and operations that have been described herein in connection with various network elements (e.g., an SMF set, a UDSF, an NRF, a UPF). In some embodiments, a plurality of computing systems 300 can collectively implement the actions and operations that have been described herein in connection with various network elements.

The computing system 300 includes a processor 301 and memory 303 in electronic communication with the processor 301. Instructions 305*a* and data 307*a* can be stored in the memory 303. The instructions 305*a* can be executable by the processor 301 to implement some or all of the methods, steps, operations, actions, or other functionality disclosed herein related to various network elements. Executing the instructions 305a can involve the use of the data 307a that is stored in the memory 303. When the processor 301 executes the instructions 305a, various instructions 305b can be loaded onto the processor 301, and various pieces of data 307b can be loaded onto the processor 301.

Unless otherwise specified, any of the various examples of modules and components described herein in connection with a network element can be implemented, partially or wholly, as instructions 305a stored in memory 303 and executed by the processor 301. Any of the various examples of data described herein in connection with a network element can be among the data 307a that is stored in memory 303 and used during execution of the instructions 305a by the processor 301.

Although just a single processor 301 and a single memory 303 are shown in the computing system 300 of FIG. 9, in an alternative configuration, a combination of processors and/or a combination of memory devices could be used.

The instructions 305a in the memory 303 can include one or more modules that can be executable by the processor 301 to perform some or all aspects of the methods that have been described herein in connection with various network elements (e.g., the method 100 shown in FIGS. 1A-1E, the method 200 shown in FIGS. 2A-2B).

For example, if the computing system 300 implements one or more SMFs within an SMF set (e.g., the SMF set 102 shown in FIGS. 1A-1E), the instructions 305a can include one or more audit module(s) 342 that are configured to perform an audit mechanism as disclosed herein (e.g., an audit mechanism corresponding to acts 115 through 121 of the method 100 shown in FIGS. 1A-1E). The instructions 305a can also include one or more LI resource cleanup module(s) 344 that are configured to clean up hanging LI resources as disclosed herein (e.g., as in acts 123 through 127 of the method 100 shown in FIGS. 1A-1E).

As another example, if the computing system 300 implements a data store such as a UDSF (e.g., the UDSF 108 shown in FIGS. 1A-1E), the instructions 305a stored in the memory 303 can include one or more request handling module(s) 346 that are configured to respond to update requests (e.g., as in acts 117 and 121 in the method 100 shown in FIGS. 1A-1E).

The data 307a stored in the memory 303 can include any of the various examples of data described herein in connection with various network elements. For example, the data 307a stored in the memory 303 can represent data that is stored, accessed, or otherwise used in connection with the methods that have been described herein in connection with various network elements (e.g., the method 100 shown in FIGS. 1A-1E, the method 200 shown in FIGS. 2A-2B).

As another example, if the computing system 300 implements a data store such as a UDSF (e.g., the UDSF 108 shown in FIGS. 1A-1E), the data 307a stored in the memory 303 can include a plurality of identifiers 348. In some embodiments, as discussed above, each SMF can be configured with the NEID as well as the NF instance ID of all other SMFs in the set.

The data 307a stored in the memory 303 can also include a plurality of auditing records 316. The auditing records 316 shown in FIG. 3 can represent any of the auditing records described herein in connection with a UDSF (e.g., the auditing records 116-1, 116-2, 116-3 shown in FIG. 1C).

The specific instructions 305a and data 307a shown in FIG. 3 are provided for purposes of example only and should not be interpreted as limiting the scope of the present disclosure. A computing system 300 that implements any of the techniques disclosed herein can include other instructions 305a and/or other data 307a in addition to or instead of what is specifically shown in FIG. 3.

The computing system 300 can also include various other components, including one or more communication interfaces 309, one or more input devices 311, and one or more output devices 313.

The communication interface(s) 309 can be configured to communicate with other computing systems and/or networking devices. This includes receiving data transmissions from other computing systems and/or networking devices, and also sending data transmissions to other computing systems and/or networking devices.

The various components of the computing system 300 can be coupled together by one or more buses, which can include a power bus, a control signal bus, a status signal bus, a data bus, etc. For simplicity, the various buses are illustrated in FIG. 9 as a bus system 319.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a network core of a fifth generation (5G) wireless network comprising a plurality of triggering functions and a data store, a method for cleaning up hanging lawful interception (LI) resources, the method comprising:
    causing each triggering function among the plurality of triggering functions on the network core of the 5G wireless network to send an update request to the data store in response to being notified about a failed triggering function within the plurality of triggering functions, wherein each update request comprises a request to change ownership of an auditing record corresponding to the failed triggering function;
    selecting a triggering function of the plurality of triggering functions as a new owner of the auditing record, the auditing record corresponding to the failed triggering function, the new owner of the auditing record being selected based on a match between a claimant attribute in the auditing record and a claimant field in the update request sent by the triggering function; and
    causing the new owner of the auditing record to send at least one request to a triggered point of interception (POI) to remove an LI resource corresponding to the failed triggering function.

2. The method of claim 1, wherein each update request comprises:
    the claimant field that identifies the failed triggering function; and
    a request to modify the claimant attribute of the auditing record to an identifier associated with a sender of the update request.

3. The method of claim 2, wherein the request to modify the claimant attribute is only granted when the claimant field matches the claimant attribute of the auditing record.

4. The method of claim 1, wherein:
    the failed triggering function comprises a failed session management function (SMF); and
    the plurality of triggering functions comprise a plurality of SMFs.

5. The method of claim 1, wherein the data store comprises an unstructured data storage network function (UDSF).

6. The method of claim 1, wherein the triggered POI resides within a user plane function (UPF).

7. The method of claim 1, further comprising notifying the plurality of triggering functions about the failed triggering function.

8. The method of claim 7, further comprising causing each triggering function among the plurality of triggering functions to register with a network function repository function.

9. The method of claim 1, wherein the at least one request that is sent to the triggered POI comprises:
    a first request to deactivate all tasks associated with the failed triggering function; and
    a second request to remove all destinations associated with the failed triggering function.

10. The method of claim 1, further comprising causing the new owner of the auditing record corresponding to the failed triggering function to send a request to the data store to remove the auditing record from the data store.

11. A method for enabling hanging lawful interception (LI) resources to be cleaned up in a network core of a fifth generation (5G) wireless network, the method being implemented by a triggering function from a plurality of triggering functions, the method comprising:
    receiving a notification about a failed triggering function, the failed triggering function being one of the plurality of triggering functions implemented as network functions on the network core of the 5G wireless network;
    sending, in response to the notification, an update request to a data store on the network core of the 5G wireless network, the update request including a plurality of auditing records corresponding to the plurality of triggering functions, wherein the update request comprises a request to change ownership of an auditing record corresponding to the failed triggering function;
    receiving, in response to sending the update request, an indication that the triggering function has been selected as a new owner of the auditing record based at least in part on a match between a claimant attribute in the auditing record and a claimant field in the update request; and sending, in response to receiving the indication, a request to a triggered point of interception (POI) to remove an LI resource corresponding to the failed triggering function.

12. The method of claim 11, wherein:
the claimant field identifies the failed triggering function; and
the update request comprises a request to modify the claimant attribute of the auditing record to an identifier associated with the triggering function.

13. The method of claim 11, wherein:
the triggering function comprises a session management function (SMF);
the failed triggering function comprises a failed SMF; and
the plurality of triggering functions comprise a plurality of SMFs.

14. The method of claim 11, wherein the data store comprises an unstructured data storage network function (UDSF).

15. The method of claim 11, wherein the triggered POI resides within a user plane function (UPF).

16. The method of claim 11, further comprising registering with a network function repository function (NRF), wherein the notification about the failed triggering function is received from the NRF.

17. The method of claim 11, wherein sending the request to the triggered POI comprises:
providing a first request to deactivate all tasks associated with the failed triggering function; and
providing a second request to remove all destinations associated with the failed triggering function.

18. The method of claim 11, further comprising sending a request to the data store to remove the auditing record from the data store.

19. A system implemented in a network core of a fifth generation (5G) wireless network for cleaning up hanging lawful interception (LI) resources, the system comprising:
one or more processors;
a plurality of triggering functions in a network core of a fifth generation (5G) wireless network;
a data store including a data storage network function, the data store comprising a plurality of auditing records corresponding to the plurality of triggering functions, wherein each auditing record comprises a claimant attribute; and
instructions that are executable by the one or more processors to:
cause each triggering function among the plurality of triggering functions on the network core of the 5G wireless network to send an update request to the data store in response to being notified about a failed triggering function within the plurality of triggering functions, wherein each update request comprises a request to change ownership of an auditing record corresponding to the failed triggering function;
select a triggering function of the plurality of triggering functions as a new owner of the auditing record, the auditing record corresponding to the failed triggering function based on a match between the claimant attribute in the auditing record and a claimant field in the update request sent by the triggering function; and
cause the new owner of the auditing record to send at least one request to a triggered point of interception (POI) to remove an LI resource corresponding to the failed triggering function.

20. The system of claim 19, wherein:
each update request comprises the claimant field that identifies the failed triggering function and a request to modify the claimant attribute of the auditing record to an identifier associated with a sender of the update request; and
the request to modify the claimant attribute is only granted when the claimant field matches the claimant attribute of the auditing record.

* * * * *